(12) United States Patent
Henmi et al.

(10) Patent No.: US 9,391,400 B2
(45) Date of Patent: Jul. 12, 2016

(54) CONNECTOR WITH LEVER AND FITTING GUIDING STRUCTURE

(71) Applicant: YAZAKI CORPORATION, Tokyo (JP)

(72) Inventors: Fumitoshi Henmi, Makinohara (JP); Yuichi Motoshige, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 70 days.

(21) Appl. No.: 14/025,123

(22) Filed: Sep. 12, 2013

(65) Prior Publication Data

US 2015/0093926 A1 Apr. 2, 2015
US 2016/0190738 A9 Jun. 30, 2016

Related U.S. Application Data

(63) Continuation of application No. 13/820,237, filed as application No. PCT/JP2011/078011 on Nov. 29, 2011, now abandoned.

(30) Foreign Application Priority Data

Nov. 29, 2010 (JP) .................................. 2010-265644

(51) Int. Cl.
*H01R 13/629* (2006.01)
(52) U.S. Cl.
CPC ................. *H01R 13/62955* (2013.01)
(58) Field of Classification Search
CPC .............. H01R 13/62938; H01R 10/6272; H01R 13/639; H01R 13/64; H01R 13/346
USPC .......................................... 439/157, 148, 587
See application file for complete search history.

(56) References Cited

U.S. PATENT DOCUMENTS 5,997,321 A 12/1999 Nakata et al.
6,250,937 B1 * 6/2001 Okabe et al. ................. 439/157
(Continued)

FOREIGN PATENT DOCUMENTS

CN 1174427 A 2/1998
EP 0 843 386 A1 5/1998
(Continued)

OTHER PUBLICATIONS

Final rejection dated Dec. 2, 2014 issued by the Japanese Patent Office in counterpart Japanese Patent Application No. 2010-265644.
(Continued)

*Primary Examiner* — Tulsidas C Patel
*Assistant Examiner* — Marcus Harcum
(74) *Attorney, Agent, or Firm* — Sughrue Mion, PLLC

(57) ABSTRACT

In a connector including a tubular male housing, a female housing, and a lever turnably supported in one of this male housing and the female housing and also is engaged with an engaging part formed in the other housing and slides the male housing in a direction in which the male housing is fitted into and removed from the female housing by a turning operation, the female housing is provided with support members extending in a direction in which the male housing is fitted and removed along an outer peripheral surface of the male housing, and the male housing is provided with a pair of projecting bar parts projecting from the outer peripheral surface and guide surfaces for guiding the support members are formed on mutually opposed surfaces of this pair of projecting bar parts.

10 Claims, 6 Drawing Sheets

(56) References Cited

U.S. PATENT DOCUMENTS

| | | | |
|---|---|---|---|
| 7,481,675 B2* | 1/2009 | Patterson | H01R 13/5205 439/148 |
| 2003/0171019 A1 | 9/2003 | Itoh | |
| 2008/0102668 A1* | 5/2008 | Ikeya et al. | 439/157 |
| 2009/0163063 A1 | 6/2009 | Matsumura et al. | |
| 2009/0197456 A1 | 8/2009 | Kawai et al. | |
| 2009/0246991 A1* | 10/2009 | Shuey | 439/157 |
| 2010/0159734 A1* | 6/2010 | Horiuchi | 439/374 |

FOREIGN PATENT DOCUMENTS

| | | |
|---|---|---|
| JP | 61-127580 U | 8/1986 |
| JP | 6-5152 U | 1/1994 |
| JP | 08-130059 A | 5/1996 |
| JP | 2000-228246 A | 8/2000 |
| JP | 2003-203712 A | 7/2003 |
| JP | 2003-264037 A | 9/2003 |
| JP | 2009-181895 A | 8/2009 |

OTHER PUBLICATIONS

Office Action dated Dec. 17, 2014, issued by the European Patent Office in counterpart European Application No. 11801871.2.
Communication from the State Intellectual Property Office of P.R. China dated Oct. 8, 2014 in a counterpart application No. 201180043370.8.
Communication from the Japanese Patent Office dated Sep. 8, 2014, in a counterpart Japanese application No. 2010-265644.
International Search Report (PCT/ISA/210) dated Feb. 17, 2012, issued by the International Searching Authority in International Application No. PCT/JP2011/078011.
Written Opinion (PCT/ISA/237) dated Feb. 17, 2012, issued by the International Searching Authority, in International Application No. PCT/JP2011/078011 ?

* cited by examiner

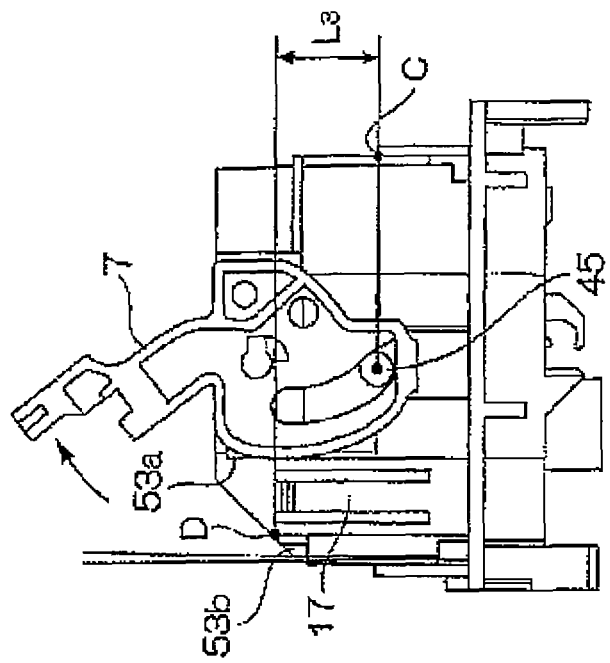
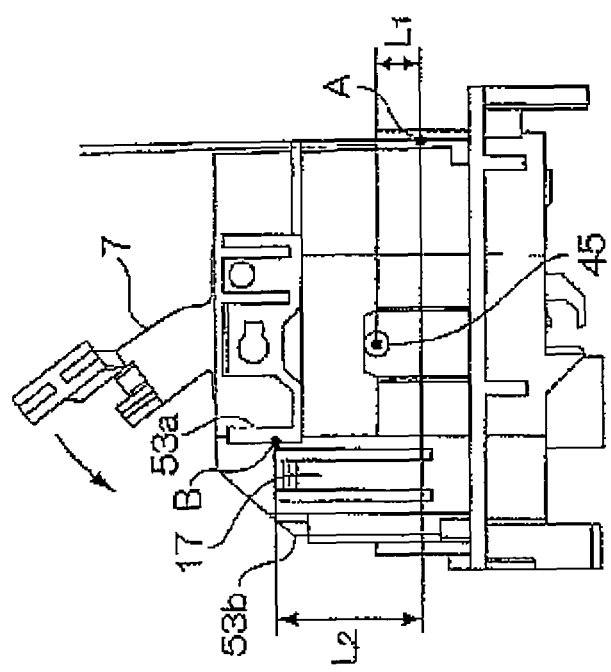

CONNECTOR WITH LEVER AND FITTING GUIDING STRUCTURE

CROSS-REFERENCE TO RELATED APPLICATIONS

This is a continuation of U.S. patent application Ser. No. 13/820,237, filed Mar. 1, 2013, which is a National Stage of International Application No. PCT/JP2011/078011 filed on Nov. 29, 2011, which claims priority from Japanese Patent Application No. 2010-265644, filed on Nov. 29, 2010. The entire disclosure of the prior applications are considered part of the disclosure of the accompanying continuation application, and are hereby incorporated by reference.

TECHNICAL FIELD

The present invention relates to a connector, and particularly to a connector for fitting and removing a male housing into and from a female housing by a turning operation of a lever.

BACKGROUND ART

An electric vehicle etc. are equipped with a DC power source such as a battery or a fuel cell as a power source for driving a load of a motor etc., and this DC power source is connected to the load through a power source circuit. As a result, the electric vehicle etc. is provided with a service plug for manually disconnecting connection to the power source circuit in order to prevent an electric shock in the case of maintenance work etc. of the load.

As this service plug, for example, a service plug constructed so that a female housing in which a tubular peripheral wall part is erected along the outer edge of an annular groove formed in a base material, a male housing having a tubular peripheral wall part inserted into an annular groove of this female housing, a circuit terminal arranged inside the annular groove of the female housing and a short-circuit terminal arranged inside the peripheral wall part of the male housing are included and the male housing can be fitted into and removed from the female housing by a turning operation of a lever has been disclosed (see PTL 1). According to this service plug, by turning the lever in a direction in which the lever is pushed down, the male housing is fitted into the female housing and the short-circuit terminals are respectively inserted into the two circuit terminals and a power source circuit becomes closed. On the other hand, at the time of inspection, the lever is turned in a direction in which the lever is pulled up and the male housing is removed from the female housing and thereby, the short-circuit terminals are respectively separated from the two circuit terminals and the power source circuit becomes opened and an electric shock etc. are prevented.

Incidentally, this kind of service plug is generally installed in an out-of-sight position accessible from the inside of a vehicle body. For example, when a battery is received under the floor, the service plug is installed in the floor panel side of the lower side of a seat cushion, and work in narrow space of the lower side of the seat cushion is done when a plug body is detached in inspection and maintenance etc. As a result, it becomes difficult to properly position the male housing with respect to the female housing and there is fear that workability decreases.

In this respect, a circularly arcuate regulation member extending higher than the peripheral wall part of the female housing from a part of the peripheral edge of the annular groove of the female housing is erected in the service plug of PTL 1. Consequently, when the male housing is attached to the female housing, the male housing is moved in a direction intersecting with an insertion direction of the short-circuit terminal and thereby, a movement position of the male housing is regulated by the regulation member and it becomes easy to position the male housing with respect to the female housing. Also, a projecting bar projecting along a fitting direction is formed on the peripheral wall part of the male housing and this projecting bar is guided inside the annular groove in a state of being fitted into a groove formed in the peripheral wall part of the female housing and thereby, alignment between the female housing and the male housing is facilitated. Consequently, the plug body can be attached and detached easily well even when the service plug is installed in space difficult to make a visual check, for example, the lower side of the seat cushion.

CITATION LIST

Patent Literature

[PTL 1] JP-A-2009-181895

SUMMARY OF INVENTION

Technical Problem

However, when the lever is turned and operated at the early stage at which the depth in which the peripheral wall part of the male housing is inserted into the annular groove of the female housing is shallow in the case of fitting the male housing into the female housing in a structure of PTL 1, some gap occurs between the annular groove and the peripheral wall part, so that the peripheral wall part of the male housing is obliquely inserted into the annular groove and inclination may occur with respect to a fitting direction.

When the male housing is fitted in a state of being inclined to the female housing thus, depending on the inclined attitude, both the housings may be damaged or the circuit terminal or the short-circuit terminal may be deformed. Here, for example, a method for inhibiting the inclination by increasing the amount of lapping over the male housing at the early stage of fitting by increasing a height of the peripheral wall part of the female housing or a height of the regulation member of PTL 1 is also contemplated, but sliding resistance at the time of insertion increases in addition to upsizing of the housing, so that this method is undesirable.

In view of the above circumstances, the present invention is aimed to inhibit inclination of a male housing by a turning operation of a lever and achieve a good state of fitting between the male housing and a female housing.

Solution to Problem

In order to achieve the purpose, a connector of the present invention is a connector including a tubular male housing, a female housing, and a lever which is turnably supported in one of the male housing and the female housing and also is engaged with an engaging part formed in the other housing and slides the male housing in a direction in which the male housing is fitted into and removed from the female housing by a turning operation, characterized in that the female housing is provided with a support member extending in a direction in which the male housing is fitted and removed along an outer peripheral surface of the male housing, and the male housing is provided with a pair of projecting bar parts projecting from the outer peripheral surface and guide surfaces for guiding the support member are formed on mutually opposed surfaces of the pair of projecting bar parts.

According to this, when the male housing is fitted into the female housing, the support member of the female housing is guided to a gap in a pair of projecting bar parts at the stage of a small amount of fitting of the male housing, so that the male housing moves in a fitting direction in a state of being positioned in the support member by a turn of the lever. Consequently, inclination of the male housing to the female housing is inhibited, so that fitting by a lever operation can be performed smoothly.

In this case, the support member is provided with a locking part which engages with an engaging part formed in the lever and regulates a turn of the lever at the time of turning the lever in a direction in which the male housing is fitted into and removed from the female housing. According to this, the support member for inhibiting inclination at the time of fitting of the male housing can also be used as a lock mechanism of the lever, so that it is unnecessary to provide the lock mechanism separately and a configuration can be simplified.

Advantageous Effects of Invention

According to the connector of the present invention, the inclination of the male housing by the turning operation of the lever can be inhibited to achieve a good state of fitting between the male housing and the female housing.

BRIEF DESCRIPTION OF DRAWINGS

FIGS. 6 (*a*) and (*b*) are diagrams describing action of the connector formed by applying the present invention, and FIG. 6(*a*) is the diagram showing action at the time of insertion and FIG. 6(*b*) is the diagram showing action at the time of removal.

DESCRIPTION OF EMBODIMENTS

One embodiment of a connector formed by applying the present invention will hereinafter be described in detail with reference to FIGS. 1 to 6.

The connector of the present embodiment is mounted in a vehicle such as an electric vehicle or a hybrid car (not shown), and is a connector for disconnecting a power source circuit for making connection between a load of a motor etc. for driving the vehicle and a DC power source such as a battery or a fuel cell for supplying electric power to this load, and will concretely be described by taking a service plug attached to a battery case as an example. But, as long as the connector is a connector removable by a lever operation, the connector is not limited to this connector, and the present invention can also be applied to, for example, a connector for charging.

Figure 1:
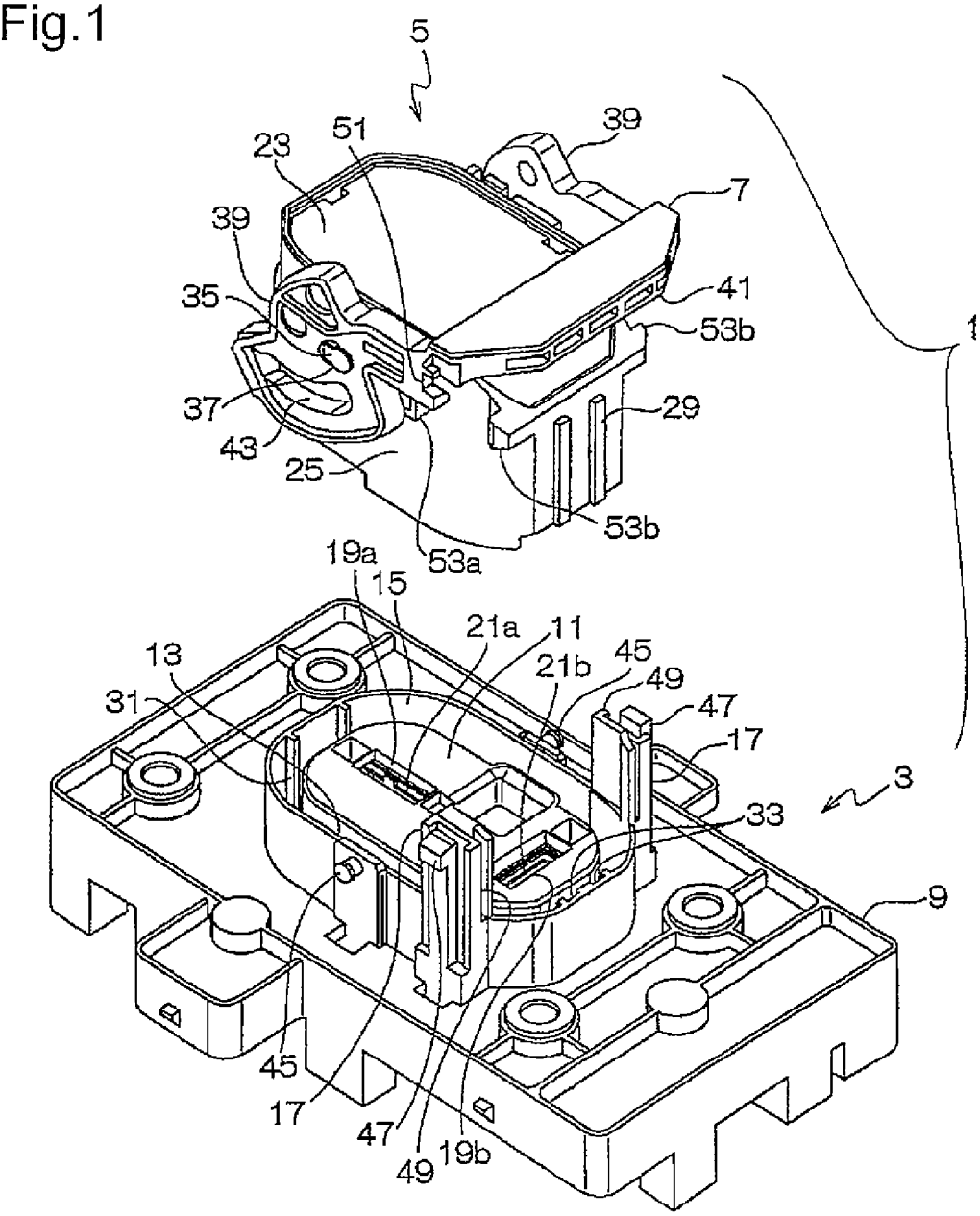
FIG. 1 is an exploded perspective view of a connector formed by applying the present invention.

As shown in FIG. 1, a connector 1 of the embodiment includes a female housing 3, a male housing 5 fitted into the female housing 3, and a lever 7 for fitting and removing the male housing 5 into and from the female housing 3.

The female housing 3 includes a base material 9 attached to a battery case etc., a terminal fixing part 11 with a flat upper surface bulging from this base material 9 in an oval shape, an annular groove 13 formed along a peripheral wall of this terminal fixing part 11, a first peripheral wall part 15 erected from the base material 9 so as to surround the annular groove 13 as opposed to the peripheral wall of the terminal fixing part 11, and two support members 17 erected upward beyond the upper end of the first peripheral wall part 15 along an outer peripheral surface of this first peripheral wall part 15. Two rectangular openings 19*a*, 19*b* are formed in the terminal fixing part 11, and circuit terminals 21*a*, 21*b* are respectively fixed inside the openings 19*a*, 19*b*.

The male housing 5 has an end face 23 and a second peripheral wall part 25 annularly erected from a peripheral edge of the end face 23, and is formed in a tubular container in which the top side of the second peripheral wall part 25 is opened. The second peripheral wall part 25 is formed in an oval shape slightly smaller than the first peripheral wall part 15, and is constructed so as to be inserted into the annular groove 13 of the female housing 3. A pair of grooves 27 (FIG. 3) and a pair of projecting bars 29 are formed in the second peripheral wall part 25 along the insertion direction, and respectively are fitted into a pair of projecting bars 31 and a pair of grooves 33 formed in an inner peripheral surface of the first peripheral wall part 15 and thereby, the male housing 5 is constructed so as to be guided in the insertion direction. Also, two short-circuit terminals (not shown) inserted into the openings 19*a*, 19*b* of the female housing 3 are fixed to the insertion side of the end face 23 of the male housing 5.

On the other hand, in the male housing 5, support pins 35 are formed in two side wall parts of the second peripheral wall part 25 and the support pins 35 are fitted into locking holes 37 formed in the lever 7 and thereby, the lever 7 is constructed so as to be turnably supported in the male housing 5. The lever 7 includes two support plates 39 in which the locking holes 37 are formed, and a joint 41 for mutually joining the support plates 39, and the male housing 5 is arranged in a state of being sandwiched between the two support plates 39.

Figure 4:
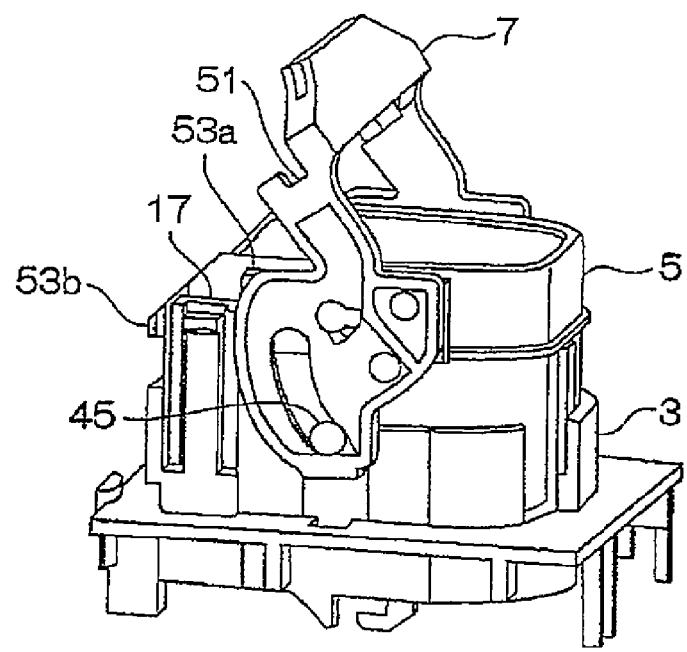
FIG. 4 is a perspective view showing an external appearance of the connector formed by applying the present invention.

A circularly arcuate cam hole 43 as a cam mechanism is formed in the lever 7, and a cam pin 45 fitted into the cam hole 43 is projected and formed on a side surface of the first peripheral wall part 15 of the female housing 3. Therefore, as shown in FIG. 4, by turning the lever 7 in a direction of raising the lever 7 in a state of fitting the cam pin 45 fitted into the cam hole 43, the cam pin 45 moves relatively along the cam hole 43 and the male housing 5 can be moved away along the annular groove 13 of the female housing 3.

Also, in the support members 17 erected from the base material 9 of the female housing 3, locking parts 47 projecting in a direction substantially orthogonal to a fitting direction are formed in the upper end sides. The locking parts 47 are joined to the bottoms of struts 49 constructing the support members 17 in a cantilever manner, and are constructed so as to be engaged with engaging parts 51 respectively formed in the support plates 39 of the lever 7 when the lever 7 is turned and pushed down. By engaging the locking parts 47 with the engaging parts 51 of the lever 7, the lever 7 is locked and a turn is regulated. By pushing and deforming the locking parts 47 of the support members 17 with the fingers in a direction (side of the struts 49) of detaching the locking parts 47 from the engaging parts 51 in this state, the lever 7 is released from the locked state.

Figure 2:
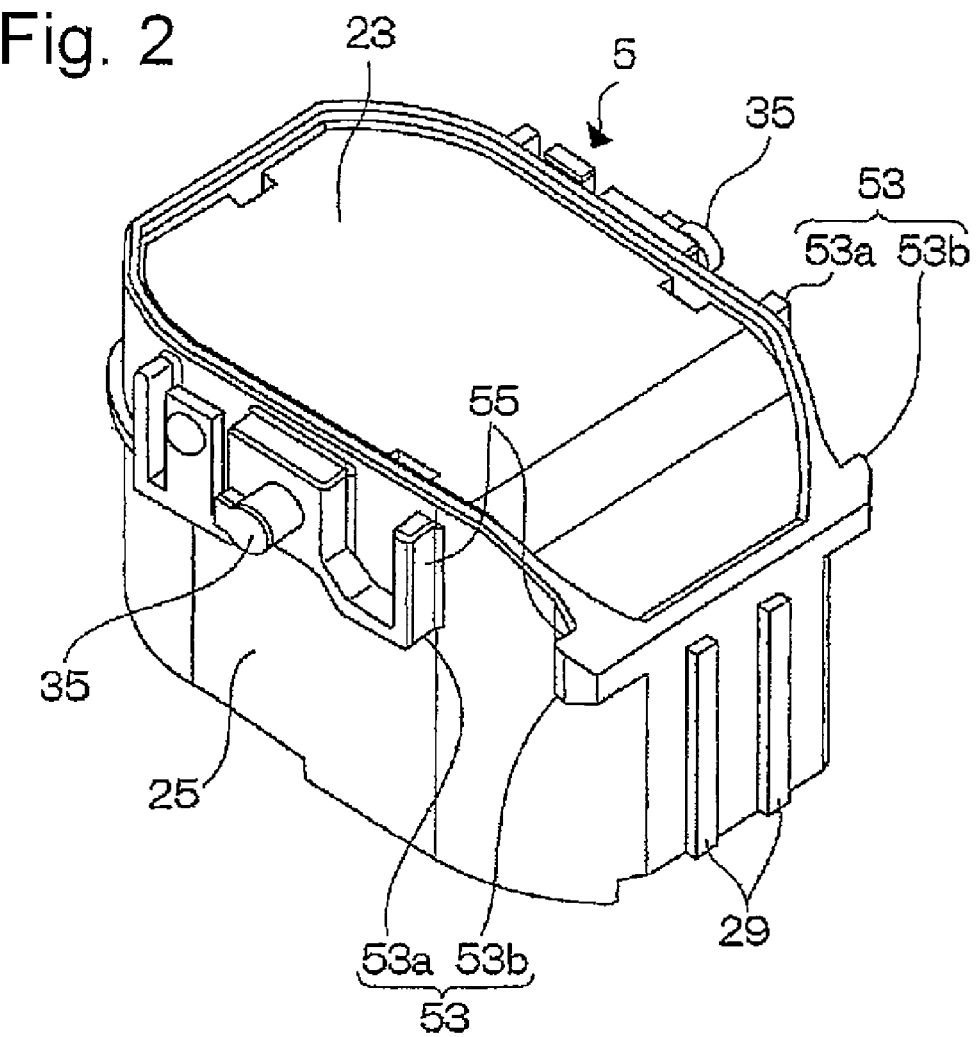
FIG. 2 is a perspective view showing a male housing of the connector formed by applying the present invention.
Figure 3:
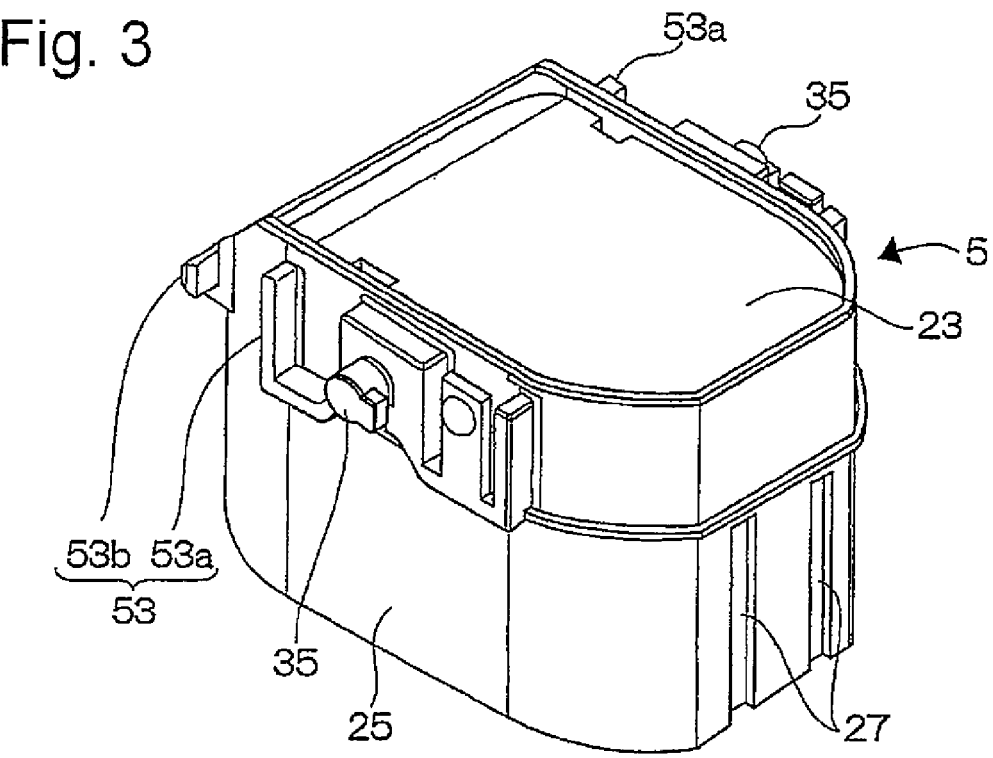
FIG. 3 is a perspective view of the male housing showing a state of setting the back of FIG. 2 to the front side.

Here, a configuration of a projecting bar part of the male housing 5 forming a characterizing portion of the embodiment will be described. When the male housing 5 is fitted into the female housing 3, the first peripheral wall part 15 and the support members 17 are respectively arranged so as to have a gap with respect to an outer peripheral surface of the second peripheral wall part 25 and be opposed to the outer peripheral surface in a state of inserting the second peripheral wall part 25 of the male housing 5 into the annular groove 13 of the female housing 3. Here, as shown in FIGS. 2 and 3, a pair of projecting bar parts 53 projecting in a rectangular shape is formed in two places of the outer peripheral surface of the second peripheral wall part 25 in the male housing 5. This projecting bar part 53 is constructed by pairing projecting bar parts 53a, 53b, and is positioned upward beyond the upper end of the first peripheral wall part 15 always in a process of fitting the male housing 5 into the female housing 3. Also, the projecting bar part 53 has opposed surfaces 55 opposed mutually, and the opposed surfaces 55 are arranged in mutually parallel in a state of extending in a direction of fitting and removing the male housing 5, and form guide surfaces for guiding the support member 17. In brief, the support member 17 is guided to space formed by the two opposed surfaces 55 and the second peripheral wall part 25.

Next, action of the connector 1 constructed thus will be described.

In a normal state, the second peripheral wall part 25 of the male housing 5 is fitted into the annular groove 13 of the inside of the support members 17 and the first peripheral wall part 15 with respect to the female housing 3, and the lever 7 becomes locked by a lock mechanism including the locking parts 47. At this time, the short-circuit terminals are respectively inserted into the two openings 19a, 19b and are connected to the circuit terminals 21 and thereby, a power source circuit is closed and electric power from a DC power source is supplied to a load.

Figure 5:
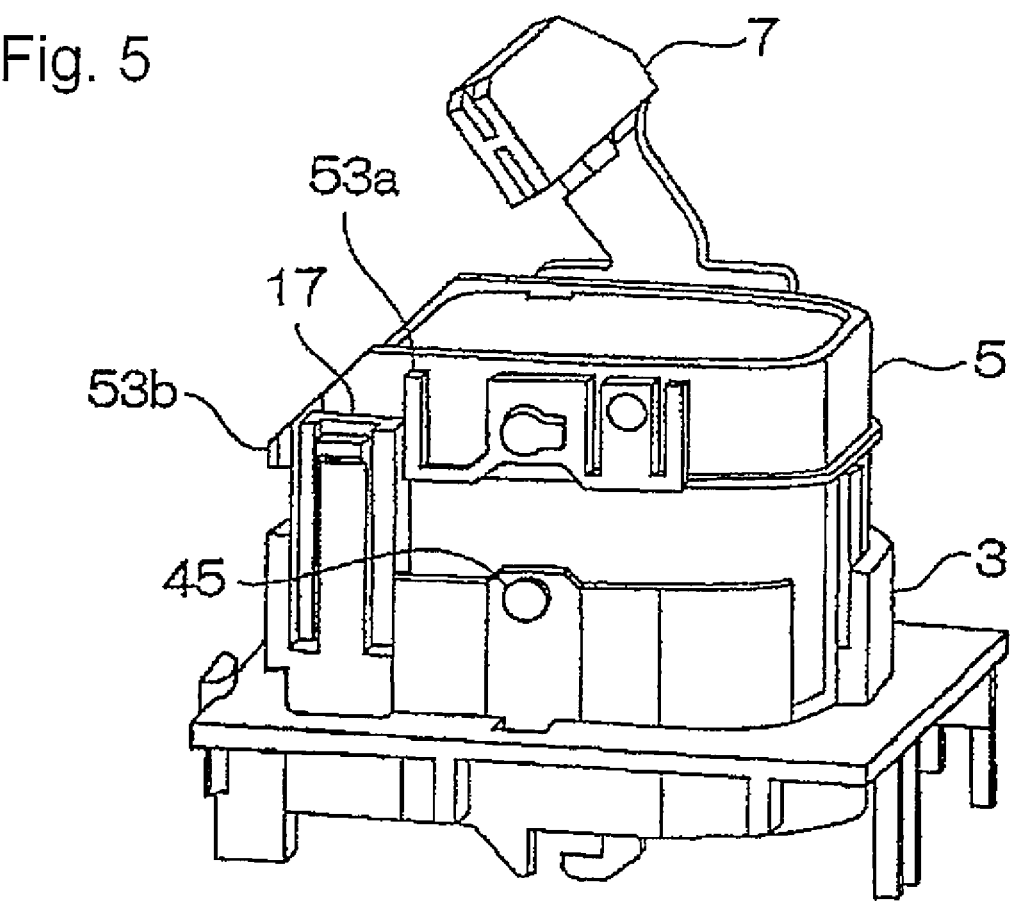
FIG. 5 is a perspective view in which a part of a lever of FIG. 4 is omitted.

When maintenance work etc. are done in this state, in order to disconnect the power source circuit, the lever 7 is unlocked and the lever 7 is turned in a direction of raising the lever 7. Consequently, the male housing 5 is lifted in a direction away from the female housing 3. Here, for example, at a point in time of turning the lever 7 to the maximum turning angle determined by the cam mechanism, the short-circuit terminals are pulled out of the two openings 19a, 19b and are detached from the circuit terminals 21 and the power source circuit becomes disconnected (FIGS. 4 and 5).

When the lever 7 is turned to the maximum turning angle and becomes raised thus, the joint 41 is subsequently gripped and the lever 7 is pulled up. By pulling up this lever 7, the cam pins 45 are detached from the cam holes 43 of the lever 7 and the male housing 5 together with the lever 7 is detached from the female housing 3. Consequently, the two short-circuit terminals are not connected to the two circuit terminals 21 again due to a malfunction etc., and an electric shock etc. in the maintenance work etc. are prevented surely.

Next, when the maintenance work etc. are ended and the power source circuit is closed, the male housing 5 to which the lever 7 is attached is moved near to the female housing 3 and the second peripheral wall part 25 of the male housing 5 is inserted into the annular groove 13 of the female housing 3. Here, the grooves 27 and the projecting bars 29 formed along the insertion direction of the second peripheral wall part 25 are respectively fitted into the projecting bars 31 and the grooves 33 of the first peripheral wall part 15 and thereby, the male housing 5 is guided in the insertion direction. Then, the lever 7 is turned in a direction of laying the lever 7 in a state of respectively fitting the cam pins 45 into the two cam holes 43 of the lever 7. Consequently, the cam pins 45 move relatively along the cam holes 43 and the male housing 5 moves in a direction near to the female housing 3. When the lever 7 is further turned, the locking parts 47 abut on the support plates 39 of the lever 7, so that the lever 7 is pushed hard in a turning direction in this state and thereby, the locking protrusions 47 are engaged with the engaging parts 51 and the lever 7 becomes locked.

Incidentally, when the lever 7 is turned and operated at a point in time when the depth in which the second peripheral wall part 25 is inserted into the annular groove 13 is shallow in the case of fitting the male housing 5 into the female housing 3 thus, the second peripheral wall part 25 may be obliquely inserted into the annular groove 13 due to inclination of the male housing 5. When the male housing 5 is fitted in a state of being inclined to the female housing 3 by the lever 7 thus, depending on the inclined attitude, for example, a part of both the housings may be damaged or the circuit terminal 21 or the short-circuit terminal may be deformed.

On the other hand, in the embodiment, the two support members 17 are respectively guided to gaps in a pair of projecting bar parts 53 formed in the second peripheral wall part 25 of the male housing 5 by turning the lever 7 in a direction of laying the lever 7 at the stage at which the depth in which the second peripheral wall part 25 is inserted into the annular groove 13 is shallow. That is, the second peripheral wall part 25 is inserted into the annular groove 13 and the male housing 5 is fitted while holding a state of being supported by the two support members 17, so that inclination to a fitting direction is inhibited at the stage of a small amount of fitting into the female housing 3. Therefore, fitting by a lever operation can be performed smoothly, and damage to both the housings, deformation of the terminal, etc. can be prevented.

Here, an effect of the projecting bar parts 53 of the embodiment will be described using FIGS. 6 (a) and 6(b). FIG. 6(a) shows a state just after a turning operation of the lever 7 is started at the early stage at which the male housing 5 is fitted into the female housing 3, and FIG. 6(b) shows a state of turning the lever 7 to the maximum allowable angle at the stage at which the male housing 5 is removed from the female housing 3. In addition, half of the front of the lever 7 is omitted in FIG. 6(a).

As shown in FIG. 6(a), by turning the lever 7 in a direction of an arrow, the male housing 5 moves in a turning direction of the lever 7 using the cam pins 45 as the center of rotation and becomes slightly inclined to a fitting direction. By this inclination, in the male housing 5, the lower end of the second peripheral wall part 25 makes contact with the first peripheral wall part 15 of the female housing 3 at a point A and further, the projecting bar parts 53a make contact with the support members 17 at a point B, so that a further increase in inclination is inhibited. Here, while the only the point A and the cam pins 45 form an action point at which the inclination is inhibited at the time when the male housing 5 is inclined in a conventional connector structure without the support members 17, the embodiment has the support members 17, so that both the point A and the point B and the cam pins 45 form the action point. Therefore, according to the embodiment, the maximum distance between the action points in the fitting direction can be increased from conventional L1 to L2, so that the inclination at the time of inserting the male housing 5 can be inhibited more effectively and fitting by a lever operation can be performed smoothly.

On the other hand, as shown in FIG. 6(b), by turning the lever 7 to the maximum turning angle, the male housing 5 moves in the turning direction of the lever 7 using the cam pins 45 as the center of rotation and becomes slightly inclined to the fitting direction. By this inclination, the upper end of the first peripheral wall part 15 makes contact with the second peripheral wall part 25 at a point C and further, the projecting bar parts 53b make contact with the support members 17 at a point D, so that a further increase in inclination is inhibited. Here, while the only the point C and the cam pins 45 form the action point at which the inclination is inhibited at the time when the male housing 5 is inclined in the conventional connector structure without the support members 17, the embodiment has the projecting bar parts 53a, 53b, so that both the point C and the point D and the cam pins 45 form the action point. Therefore, while the maximum distance between the action points in the fitting direction could hardly be obtained conventionally, according to the embodiment, L3 can be obtained, so that the inclination at the time of removing the male housing 5 can be inhibited and removal by the lever operation can be performed smoothly.

In the embodiment, the support members 17 are used as both of inclination inhibiting means of the male housing 5 and a lock mechanism for regulating rotation of the lever 7, so that it is unnecessary to provide the lock mechanism separately and a configuration can be simplified. Here, the support members 17 are configured to extend upward beyond the cam pins 45 or the upper end of the first peripheral wall part 15 in the fitting direction of the male housing 5 and be guided to the projecting bar parts 53 in a position offset from a fitting surface, but are not limited to the example of the embodiment as long as the support members 17 are configured to guide the male housing 5 in such a position.

In the embodiment, the example in which the two support members 17 arranged so as to sandwich the male housing 5 from both sides are respectively guided between a pair of projecting bar parts 53 is described, but is not limited to this and, for example, one support member 17 or three or more support members 17 may be configured to be respectively guided between a pair of projecting bar parts 53. Also, in the embodiment, the example of forming a pair of projecting bar parts 53 by rectangular protrusions 53a, 53b is described, but is not limited to the rectangular shape as long as the projecting bar parts 53 have the mutually parallel opposed surfaces 55a, 55b for smoothly guiding the support members 17.

This application is based upon and claims the benefits of priority of Japanese Patent Application No. 2010-265644 filed on Nov. 29, 2010, the contents of which are incorporated herein by reference.

INDUSTRIAL APPLICABILITY

According to the connector of the present invention, the inclination of the male housing by the turning operation of the lever can be inhibited to achieve a good state of fitting between the male housing and the female housing.

REFERENCE SIGNS LIST

1 CONNECTOR
3 FEMALE HOUSING
5 MALE HOUSING
7 LEVER
9 BASE MATERIAL
13 ANNULAR GROOVE
15 FIRST PERIPHERAL WALL PART
17 SUPPORT MEMBER
25 SECOND PERIPHERAL WALL PART
35 SUPPORT PIN
37 LOCKING HOLE
43 CAM HOLE
45 CAM PIN
47 LOCKING PART
51 ENGAGING PART
53 PROJECTING BAR PART
55 OPPOSED SURFACE

What is claimed is:

1. A connector, comprising:
a tubular male housing;
a female housing; and
a lever which is turnably supported in one of the male housing and the female housing and is engaged with a first engaging part formed in the other housing and slides the male housing in a direction in which the male housing is fitted into and removed from the female housing by a turning operation,
wherein the female housing is provided with a support member extending in a direction in which the male housing is fitted and removed along an outer peripheral surface of the male housing,
the male housing is provided with a pair of projecting bar parts projecting from the outer peripheral surface and guide surfaces for guiding the support member are formed on mutually opposed surfaces of the pair of projecting bar parts,
a peripheral wall part is erected from the female housing, and
the support member is erected upward beyond an upper end of the peripheral wall part towards the male housing along an outer peripheral surface of the peripheral wall part.

2. The connector as claimed in claim 1, wherein the support member is provided with a locking part which engages with a second engaging part formed in the lever and regulates a turn of the lever at the time of turning the lever in a direction in which the male housing is fitted into and removed from the female housing.

3. The connector as claimed in claim 1, wherein the support member is extended from the female housing in a direction toward the male housing.

4. The connector as claimed in claim 1, wherein the male housing is inserted into an annular groove formed by the upper end of the peripheral wall part.

5. The connector as claimed in claim 1, wherein the upper end of the peripheral wall part is erected from the female housing in a direction towards the male housing.

6. The connector as claimed in claim 1, wherein the support member is extended, in a direction towards the male housing, from before the first engaging part to beyond the first engaging part.

7. The connector as claimed in claim 1, wherein the first engaging part comprises a cam pin formed on the peripheral wall part, and
the lever comprises a cam hole engaged with the cam pin to slide the male housing in a direction in which the male housing is fitted into and removed from the female housing.

8. The connector as claimed in claim 1, wherein the outer peripheral surface of the peripheral wall part along which the support member is provided is substantially parallel to a direction of the turning operation of the lever.

9. The connector as claimed in claim 1, wherein the pair of projecting bar parts is provided such that the support member is placed between the pair of projecting bar parts.

10. The connector as claimed in claim 2, wherein the locking part is formed at a distal end of the support member.

* * * * *